Patented June 6, 1950

2,510,904

UNITED STATES PATENT OFFICE 2,510,904

ABIETYL BORATES

Walter A. Raczynski, Wilmington, Del., assignor to Hercules Powder Company, Wilmington, Del., a corporation of Delaware No Drawing. Application September 25, 1948, Serial No. 51,315

13 Claims. (Cl. 260—100)

This invention relates to new compositions of matter. More particularly, the invention relates to boric acid esters of rosin alcohols.

It is known to produce a polymeric, resinous material by the reaction of rosin alcohols with ortho-boric acid in the proportion of one chemical equivalent of the former to about three chemical equivalents of the latter. These ingredients polymerize when heated together, ostensibly through the unesterified portions of the ortho-boric acid molecules, to form resins containing no free acid. These resins may be designated as rosin alcohol borate-polyanhydrides. These rosin alcohol borate-polyanhydride resins, however, become quite yellow and opaque after a very short aging period. Furthermore, they are heat-unstable at temperatures of 320° C. and above and are difficult to prepare in large quantities. The utility of these polyanhydride resins is thus sharply curtailed. For example, pressure-sensitive tapes coated with adhesive compositions formulated with these resins impart undesirable yellow stains in a very short time to the surfaces to which they are applied.

Now in accordance with this invention, there have been prepared rosin alcohol borates which contain in chemical combination a rosin alcohol (hereinafter referred to as "an abietyl alcohol") and a boric acid in the proportions of about one chemical equivalent of the former to from about one to about one and six-tenths chemical equivalents of the latter. These new abietyl borates are characterized by remarkable and unexpected color stability. After several weeks' aging, they remain substantially water white and transparent. Furthermore, these new materials are heat-stable at temperatures in excess of 320° C. and may easily and economically be prepared in large quantities. These unique new esters are essentially monomeric in nature and represent a significant advance in the art over the rosin alcohol borate-polyanhydride resins previously known, which become yellow and opaque after a short period of aging and which are relatively heat-unstable.

The term "an abietyl alcohol" is employed herein to designate those alcohols which are derived from abietic acid, hydrogenated abietic acid, dehydrogenated abietic acid, or any of the esters, salts or anhydrides of the aforesaid acids. Thus, the term includes abietyl alcohol, dihydroabietyl alcohol, tetrahydroabietyl alcohol, dehydroabietyl alcohol, or mixtures of such alcohols. Any of the procedures known to the art for effecting the hydrogenation of the aforesaid acids or derivatives thereby to yield alcohols may be employed. For example, the sodium reduction of esters of the aforesaid acids according to the well-known general method of Bouveault and Blanc may be employed. See in this connection U. S. 2,021,100, issued November 12, 1935. The abietyl alcohols employed in this invention may also be conveniently prepared by the hydrogenation, in the presence of a hydrogenation catalyst, of the aforesaid acids, their esters, salts or anhydrides according to the methods described in U. S. 2,358,234 and U. S. 2,358,235, issued September 12, 1944. When such catalytic hydrogenation procedures are employed, it is possible if the proper conditions are utilized partially or completely to saturate the ethylenic double bonds of the acids or their derivatives while simultaneously effecting the reduction of the carboxyl group to the alcohol group.

Although substantially pure abietic acid or the aforementioned derivatives thereof may be employed in producing the abietyl alcohols used in this invention, it is more desirable from an economic standpoint to employ abietic acid-containing materials such as the various grades of wood or gum rosin available commercially or suitable derivatives thereof as, for example, hydrogenated rosin, dehydrogenated rosin, esters of any of the aforesaid rosins, salts of the aforesaid rosins, or anhydrides of the aforesaid rosins. Wood rosin contains substantial amounts of abietic acid, whereas gum rosins are reported to be composed mainly of d-pimaric acid, l-pimaric acid, and sapinic acid. However, under the influence of acids and/or heat, certain of the acids in gum rosin isomerize to abietic acid. It will be understood that gum rosin is the full equivalent of wood rosin for the preparation of abietyl alcohols for use in this invention. In fact, if desired, any of the substantially pure resin acids or mixtures thereof may be used equivalently for abietic acid or wood or gum rosin in preparing the alcohols employed in accordance with this invention.

As indicated above, hydrogenated abietic acid or any of the esters, salts or anhydrides thereof may be used in preparing suitable abietyl alcohols for use in this invention. Suitable procedures for hydrogenating the ethylenic double bonds of abietic acid or its derivatives are known to the art as, for example, those disclosed in U. S. 2,094,117 and U. S. 2,155,036. It will be recognized that abietyl alcohol can first be prepared from abietic acid or its esters, salts or its anhydride and the alcohol itself treated with hydrogen to effect the desired degree of hydrogenation of the ethylenic bonds.

Dehydrogenated abietic acid or any of the esters, salts or the anhydride thereof have been stated to be useful in preparing suitable abietyl alcohols for use in accordance with the invention. Suitable procedures for dehydrogenating abietic acid or its derivatives are known to the art. Thus, it is possible to effect substantial dehydrogenation of these compounds by treating the same with an active hydrogenation catalyst under conditions of reaction adapted to product an intra- and inter-molecular rearrangement of the hydrogen atoms in the resin acid nuclei of the compounds and in the absence of added substances capable of reducting the ethylenic unsaturation of the comuounds under the conditions of treatment. See U. S. 2,154,629 in this connection. This treatment is sometimes referred to as disproportionation. Certain types of heat-treatment also effect dehydrogenation of abietic acid and its derivatives. It will again be recognized that abietyl alcohol can first be prepared from abietic acid or its esters, salts or its anhydride and the alcohol itself dehydrogenated to form dehydroabietyl alcohol for use in accordance with this invention.

Having thus described the nature and purpose of this invention, the following examples are offered as specific embodiments thereof. All parts are by weight unless otherwise indicated. The "hydroabietyl alcohol" to which reference is made in the ensuing examples was a product obtained by hydrogenation of the methyl ester of rosin, approximately 85% of which was rosin alcohols; approximately 45% of these rosin alcohols was tetrahydro-abietyl alcohol, approximately 40% of dihydroabietyl alcohol, and about 15% dehydroabietyl alcohol.

Example I

Seven hundred fourteen grams of hydroabietyl alcohol (2.1 moles or 2.1 chemical equivalents) and 43 grams (0.7 mole or 2.1 chemical equivalents) of ortho-boric acid were charged into a one-liter, three-necked flask equipped with a stirrer, a gas inlet tube, a moisture trap and attached condenser, and a thermometer. The charge was heated under an atmosphere of nitrogen at a temperature of 150°–152° C. for four hours. The reaction mixture was continuously agitated throughout the esterification period. Two moles of water were collected, indicating that the esterification reaction had gone to completion and that a neutral ester (the triester of hydroabietyl alcohol and ortho-boric acid) had been formed. The resultant product was a clear, water-white resin characterized by a drop softening point of 59° C. This novel resin demonstrated remarkable color stability and did not become yellow or opaque after several weeks' aging. Furthermore, this novel resin was heat stable at a temperature of 330° C.

Example II

Three hundred forty grams of hydroabietyl alcohol (1 mole or 1 chemical equivalent) and 33 grams (0.533 mole or 1.60 chemical equivalents) of ortho-boric acid were charged into the same equipment and esterfied in the same manner as that described in Example I. When approximately one mole of water had been collected, indicating that the hydroabietyl alcohol had been completely esterified, the reaction was discontinued. The resultant resin was clear and water white and was characterized by a drop softening point of 77° C. This resin, like that described in Example I was characterized by outstanding color stability and did not become yellow or opaque after several weeks' aging.

The abietyl borates of this invention are preferably produced by the esterification of one chemical equivalent of an abietyl alcohol with from about one to about one and six-tenths chemical equivalents of ortho-boric acid ($H_3BO_3$). However, other boric acids, such as meta-boric acid ($HBO_2$) and tetraboric acid ($H_2B_4O_7$) may be equivalently utilized. Under the reaction conditions, both meta- and tetraboric acids rehydrate to the ortho-boric form. Hence, the same product is obtained irrespective of the specific boric acid utilized. As a consequence of this fact, of course, the meta- and tetroboric acids should be employed in such an amount that there is formed from about one to about one and six tenths chemical equivalents of orthoboric acid for each chemical equivalent of abietyl alcohol. Thus, for the purposes of this invention, one-third of the molecular weight thereof may be considered as a chemically equivalent amount of meta-boric acid, and one-twelfth of the molecular weight thereof may be considered as a chemically equivalent amount of tetraboric acid.

Boric acid in excess of that theoretically required for complete esterification of the abietyl alcohol present is utilized when it is desired to increase the drop softening points of the esters prepared by reacting one chemical equivalent of an abietyl alcohol with one chemical equivalent of a boric acid. However, no appreciable additional increase in the drop softening points attends the utilization of more boric acid than that hereinbefore specified. On the contrary, the novel products of this invention are not obtained if this upper limit of boric acid concentration is substantially exceeded. Instead, complete esterification is made difficult by the presence of an excess of boric acid and clear water-white resins containing no free acid are not obtained. Likewise, substantial compliance with the lower limit of boric acid concentration, as hereinbefore specified, is essential to the production of the novel products of this invention.

The esterification reaction by which the products of this invention may be prepared is preferably, although not necessarily, effected in an inert atmosphere by simultaneously heating and agitating a mixture of an abietyl alcohol and a boric acid. Esterification catalysts are generally unnecessary for the reason that the boric acids are quite easily esterified with the abietyl alcohols with which this invention is concerned. Such catalysts may, however, be employed, if desired. Likewise, other methods of esterification known to the art may be utilized to yield the products of this invention. The reaction mixture may be vacuum sparged, if desired. The drop softening point of the final product may be increased somewhat by this means.

It is preferable to carry out the esterification reaction at a temperature of from about 140° C. to about 200° C. Temperatures in excess of 200° C. may be utilized, however, so long as the decomposition temperature of none of the components of the reaction mixture is exceeded. Likewise, temperatures somewhat below 140° C. may be employed, if desired.

The abietyl borates of this invention may, however, be prepared by processes other than the conventional esterification process hereinbefore described. Thus, an ester interchange reaction may be utilized. For example, an acetate of an abietyl alcohol may be reacted with trimethyl ortho-borate to produce an abietyl ortho-borate. Likewise, the resins of this invention may be produced by alcoholysis for example, by the reaction of an abietyl alcohol with trimethyl ortho-borate. Furthermore, the abietyl borates may also be prepared by the reaction of such compounds as boron trichloride or boron tribromide with an abietyl alcohol.

Regardless of the method by which the abietyl borates are prepared, it is preferable that all the hydroxyl groups of the abietyl alcohol be esterified with borate radicals. When the conventional esterification reaction is utilized within the preferred temperature range of from about 140° C. to about 200° C., it customarily reaches completion in from three to five hours. The progress of the reaction may be followed by noting the quantity of water of esterification liberated. Heating of the reaction mixture is preferably discontinued, particularly if an excess of boric acid is employed, when that amount of water of esterification has been liberated which would result from the complete esterification of all of the hydroxyl groups of abietyl alcohols present.

The physical constants of the borates with which this invention is concerned, of course, vary somewhat depending upon the particular abietyl alcohol or mixture of abietyl alcohols which is subjected to esterification and the relative proportions of boric acid utilized. Likewise, the drop softening point of the ultimate product may be varied somewhat by the extent of vacuum sparging to which the reaction mixture has been subjected. Thus, for example, when the "hydroabietyl alcohol" utilized in the experiments described in the examples is esterified with the chemically equivalent amount of ortho-boric acid, the resultant product is characterized by a drop softening point of from 60° C. to 69° C., depending upon the extent of sparging to which the product is subjected. The utilization of an excess of ortho-boric acid within the limits hereinbefore specified results in the production of esters, the drop softening points of which may vary from 60° C. to 80° C. The utilization of a substantially pure abietyl alcohol; i. e., an abietyl alcohol from which the nonalcoholic constituents have been removed, results in resins characterized by considerably higher drop softening points than those demonstrated by the resins previously described.

The abietyl borates of this invention are particularly valuable as compounding ingredients for surgical and industrial pressure-sensitive adhesive compositions and for wax coating compositions. As previously mentioned, these new borates do not become yellow or opaque or otherwise discolored when subjected to extended aging. Hence, pressure-sensitive tapes and similar materials manufactured with adhesive masses containing these novel borates do not show objectionable coloration or opaqueness with aging and do not stain the surfaces with which they come in contact.

The new compositions of matter with which this invention is concerned are also of great value in paraffin wax compositions. Various materials have heretofore been added to paraffin wax for such purposes as improving the adhesion and wetting power thereof. The glycol esters of rosin or hydrogenated rosin are examples of such additives. However, a distinct disadvantage has attended the utilization of many of these prior art additives in that they combine with the paraffin wax in such a manner as to produce a sludge which became deposited in and clogged the pipes and other portions of the machinery of the wax coating plants. When incorporated with paraffin wax to provide coatings for paper, cellophane, glassine, and the like, the new abietyl borates of this invention improve the adhesion and wetting power of the wax, yet form no undesirable sludge. Furthermore, the abietyl borates of this invention are substantially completely miscible with paraffin wax, and hence may be combined therewith over a wide range of proportions.

The following examples are offered for the purpose of illustrating the use of the abietyl borates of this invention in pressure-sensitive adhesive and paraffin wax coating compositions. All parts are by weight unless otherwise indicated.

*Example III*

A pressure-sensitive adhesive composition was prepared from natural rubber and the resin of Example I. The pressure-sensitive adhesive composition was formulated as follows: A solution was prepared containing 50% of the above-described hydroabietyl ortho-borate and 25% each of toluene and hexane. This solution was blended with a toulene solution of natural rubber containing 10% solids in such a manner that the natural rubber and hydroabietyl ortho-borate were present in equal amounts in the final blended mixture. In this manner, there was obtained a clear, homogeneous solution. This solution was cast onto glass in thin layers. A light-colored, transparent film resulted which was quite tacky and demonstrated excellent adhesion to glass, cellophane, cloth, and paper. This film did not discolor or become opaque upon aging. The tensile strength of this film on cloth was 2.8 pounds per linear inch.

A portion of cellophane coated on one side with the above-described pressure-sensitive mass was applied to a white enameled panel. After two weeks' exposure, the adhesive mass had imparted no appreciable yellow stain to the enameled surface. After immersion in water for from four to twenty-four hours, the above-described film retained its original tack.

*Example IV*

An adhesive composition similar to that described in Example III was prepared. In this case, however, GR–S–10 synthetic rubber (butadiene-1,3-styrene copolymer) was substituted for the natural rubber ingredient of the adhesive composition. This adhesive mass was cast into a thin film on a glass plate in the same manner as described in Example III. The resultant light-colored transparent film was quite tacky and demonstrated excellent adhesion to glass, cellophane, cloth, and paper. This film did not discolor or become opaque upon aging.

*Example V*

A paraffin wax coating composition containing the same hydroabietyl ortho-borate as that described in Example I was prepared by heating and mixing 90 parts of fully refined paraffin wax characterized by a melting point of 130° C. and 10 parts of the hydroabietyl ortho-borate in an open vessel at 100° C. for 30 minutes. A colorless melt was obtained which deposited no sludge after ten days' standing at 100° C. A similar paraffin wax coating composition formulated with the glycerol ester of hydrogenated rosin rather than hydroabietyl ortho-borate deposited a yellowish brown sludge after standing for about 20 hours at 100° C. Such sludge creates a major problem in the paraffin wax coating industry for the reason that the sludge clogs the pipe lines and other plant equipment.

Although the examples have illustrated the use of natural rubber and GR–S–10 synthetic rubber as compounding ingredients for adhesive masses containing the abietyl borates of this invention, substantially all types of natural and synthetic rubber may be so utilized. Accordingly, butadiene-styrene and butadiene-acrylonitrile copolymer-type synthetic rubbers, polychlorobutadiene, polystyrene, polyethylene-polysulfide copolymer, polyisobutylene, and other natural and synthetic rubber materials are operable in such compositions. Furthermore, the amount of abietyl borate employed may be widely varied. Thus, improved adhesive compositions may be prepared which contain from about 20 to about 80% by weight of the abietyl borates.

As previously mentioned, the substantially monomeric abietyl borates of this invention are new to the art and are quite distinct chemically from rosin alcohol borate-polyanhydride materials heretofore known. These compositions are characterized by novel and unexpected properties such as excellent color stability characteristics and good heat stability. As a consequence of such properties, these novel abietyl borates are excellent compounding ingredients for pressure-sensitive adhesive masses. Likewise, they may be utilized to increase the adhesion and wetting power of paraffin wax without the attendant formation of undesirable sludge. In addition, these new abietyl borates are compatible with natural waxes, such as carnauba wax, and other natural and synthetic waxes and, hence, may be utilized in various coating, polishing, and protective compositions.

What I claim and desire to protect by Letters Patent is:

1. Abietyl borates containing in chemical combination an abietyl alcohol and a boric acid in the proportion of one chemical equivalent of the alcohol to from about one to about one and six-tenths chemical equivalents of the boric acid.

2. The product of claim 1 wherein the alcohol esterified is abietyl alcohol.

3. The product of claim 2 wherein the abietyl alcohol is esterified with ortho-boric acid.

4. The product of claim 3 wherein the abietyl alcohol is esterified with a chemically equivalent amount of a boric acid.

5. The product of claim 1 wherein the alcohol esterified is a hydroabietyl alcohol.

6. The product of claim 5 wherein the hydroabietyl alcohol is esterified with ortho-boric acid.

7. The product of claim 6 wherein the hydroabietyl alcohol is esterified with a chemically equivalent amount of ortho-boric acid.

8. The product of claim 6 wherein the hydroabietyl alcohol esterified is tetrahydroabietyl alcohol.

9. The product of claim 8 wherein the tetrahydroabietyl alcohol is esterified with a chemically equivalent amount of ortho-boric acid.

10. The product of claim 6 wherein the hydroabietyl alcohol esterified is the dihydroabietyl alcohol.

11. The product of claim 10 wherein the dihydroabietyl alcohol is esterified with a chemically equivalent amount of ortho-boric acid.

12. The neutral triesters resultant from the esterification of an abietyl alcohol with a chemically equivalent amount of ortho-boric acid.

13. The process of preparing abietyl borates by heating under esterifying conditions an abietyl alcohol and a boric acid in the proportion of about one chemical equivalent of the alcohol to from about one to about one and six-tenths chemical equivalents of a boric acid.

WALTER A. RACZYNSKI.

REFERENCES CITED

The following references are of record in the file of this patent:

FOREIGN PATENTS

| Number | Country | Date |
|---|---|---|
| 146,509 | Australia | Mar. 15, 1936 |

Certificate of Correction

Patent No. 2,510,904 June 6, 1950

WALTER A. RACZYNSKI

It is hereby certified that errors appear in the printed specification of the above numbered patent requiring correction as follows:

Column 3, lines 8 and 9, for the word "product" read *produce*; line 12, for "reducting" read *reducing*; line 13, for "comuounds" read *compounds*; line 55, for "59° C." read *69° C.*; line 66, for "esterfied" read *esterified*; column 4, line 15, for "tetroboric" read *tetraboric*; column 5, line 71, for "glycol" read *glycerol*; column 6, line 28, for "toulene" read *toluene*; column 8, line 46, [list of references cited, for "Australia" read *Austria*;

and that the said Letters Patent should be read with these corrections therein that the same may conform to the record of the case in the Patent Office.

Signed and sealed this 26th day of September, A. D. 1950.

[SEAL]

THOMAS F. MURPHY,
*Assistant Commissioner of Patents.*